US005988705A

United States Patent [19]
Norkey

[11] Patent Number: 5,988,705

[45] Date of Patent: Nov. 23, 1999

[54] QUICK CONNECT COUPLING

[75] Inventor: Phillip Norkey, Jackson, Mich.

[73] Assignee: Pilot Industries, Inc., Dexter, Mich.

[21] Appl. No.: 08/064,907

[22] Filed: May 24, 1993

[51] Int. Cl.[6] .......... F16L 37/28

[52] U.S. Cl. .......... 285/319; 251/149.6; 285/921; 285/924; 137/614.05

[58] Field of Search .......... 285/319, 321, 285/921, 924; 123/445, 446, 456, 468, 469, 463, 478; 251/149.6; 137/614.05, 515.5

[56] References Cited

U.S. PATENT DOCUMENTS

| | | | |
|---|---|---|---|
| 2,912,000 | 11/1959 | Green | 137/515.5 |
| 3,029,835 | 4/1962 | Biello et al. | 137/515.5 |
| 3,097,666 | 7/1963 | Antrim et al. | 137/515.5 |
| 3,500,859 | 3/1970 | Pearson | 137/614.05 |
| 3,601,361 | 8/1971 | Hundhausen | 285/319 |
| 3,967,679 | 7/1976 | Liljestrand | 137/515.5 |
| 4,035,005 | 7/1977 | De Vincent et al. | 285/924 |
| 4,483,510 | 11/1984 | Palau et al. | 251/149.6 |
| 4,541,457 | 9/1985 | Blenkush | 285/924 |
| 4,646,706 | 3/1987 | Emmenthal | 123/463 |
| 4,747,327 | 5/1988 | Schaller | 123/445 |
| 4,819,908 | 4/1989 | Norkey | 251/319 |
| 4,875,709 | 10/1989 | Caroll et al. | 285/319 |
| 4,902,043 | 2/1990 | Zillig et al. | 285/319 |
| 5,056,756 | 10/1991 | Norkey | 251/149.6 |
| 5,092,300 | 3/1992 | Imoehl et al. | 123/469 |
| 5,105,787 | 4/1992 | Imoehl | 123/456 |
| 5,113,900 | 5/1992 | Gilbert | 285/319 |
| 5,161,834 | 11/1992 | Norkey | 285/319 |

FOREIGN PATENT DOCUMENTS

| | | | |
|---|---|---|---|
| 2291438 | 6/1976 | France | 285/924 |
| 813183 | 5/1959 | United Kingdom | 137/515.5 |

*Primary Examiner*—Eric K. Nicholson
*Attorney, Agent, or Firm*—Gifford, Krass, Groh, Sprinkle, Anderson & Citkowski, P.C.

[57] ABSTRACT

A quick connect coupling is disclosed for use with a tubular conduit having a radially outwardly extending bead adjacent a free end of the tubing. The coupling includes an elongated tubular and cylindrical housing having an axial passageway formed through it which forms a fluid passageway and is open at both ends. One end of the housing has a enlarged diameter internal bore portion adapted to axially receive the free end of the conduit including the conduit bead as the conduit is inserted to a magnet position. A retainer within the internal bore portion of the housing lockingly engages the conduit bead when the conduit is moved to its connected position while fluid seals engage the outer periphery of the conduit. A one way valve is also contained within the housing passageway which permits fluid flow in only one direction through the housing passageway.

8 Claims, 3 Drawing Sheets

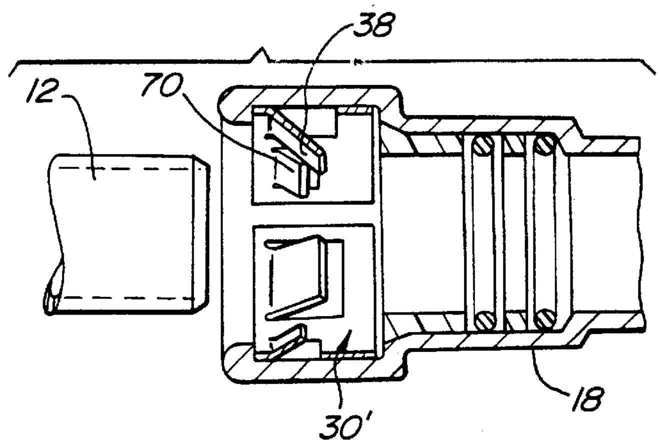
Fig-5
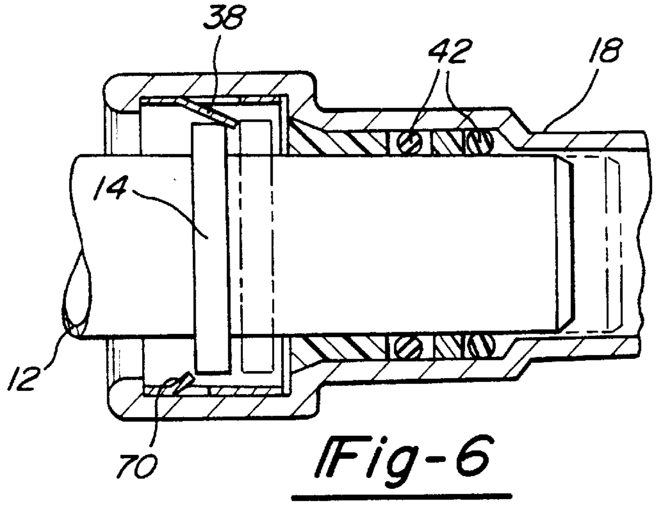
Fig-6
Fig-7
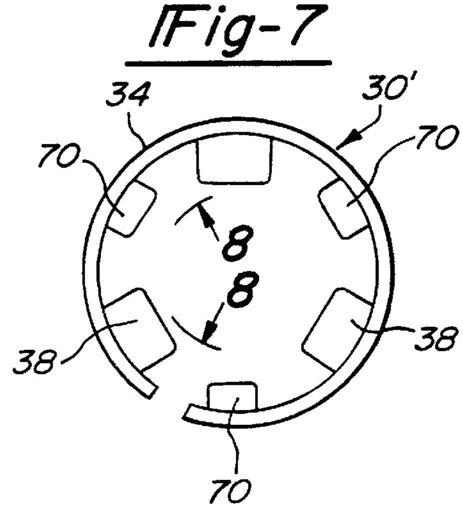
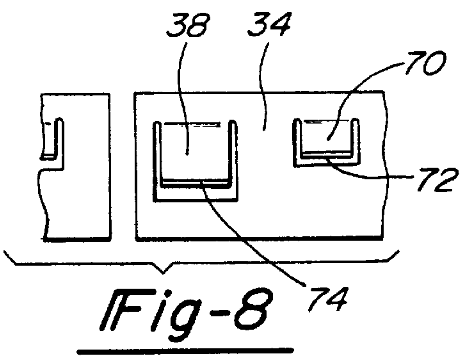
Fig-8
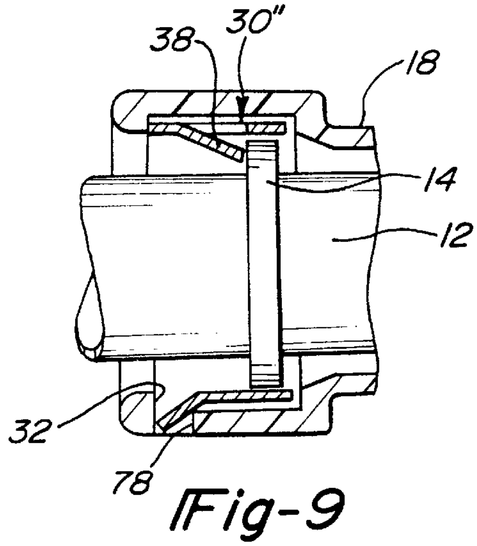
Fig-9
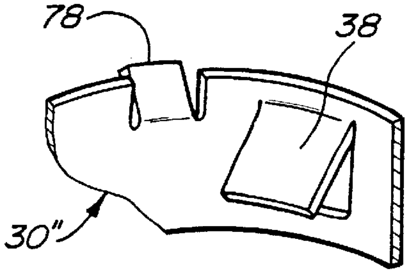
Fig-10

QUICK CONNECT COUPLING

BACKGROUND OF THE INVENTION

I. Field of the Invention

The present invention relates generally to fluid couplings and, more particularly, to a quick connect coupling adapted to receive a tubular conduit having a radially outwardly extending bead adjacent a free end of the conduit.

II. Description of the Prior Art

There are many previously known quick connect coupling which are adapted for use with tubular conduits having a radially outwardly extending bead adjacent the free end conduit. Such quick connect couplings are used extensively in the automotive industry.

These previously known quick connect couplings typically comprise an elongated tubular and cylindrical housing having an axial through bore which forms the fluid passageway. This through bore is open at both ends.

One end of the housing includes an enlarged diameter portion which is adapted to axially slidably receive the free end of the tubular conduit until the conduit bead in positioned within the interior of the housing. Furthermore, upon insertion of the conduit into the housing, a retainer contained within the housing lockingly engages the bead to retain the housing and the conduit together.

In many applications, however, it would be advantageous for the invention to include a one way valve. There are no prior quick connect couplings that include a simple, effective, inexpensive one way valve within the connector housing.

A still further disadvantage of many the previously known quick connect couplings is that, unless the fluid conduit is fully inserted into the connector housing during the assembly operation, the coupling may become disconnected in use. Such disconnection of the fluid coupling can create serious problems, particularly where the quick connect coupling is used in the fuel system of an automotive vehicle.

SUMMARY OF THE PRESENT INVENTION

The present invention provides a quick connect coupling which overcomes all of the above mentioned disadvantages of the previously known devices.

In brief, the quick connect coupling of the present invention comprises an elongated tubular and cylindrical housing having an axial bore form therethrough. This bore forms a fluid passageway and is open at both ends of the housing.

One end of the housing includes an enlarged diameter internal bore portion which is adapted to axially slidably receive the free end of the conduit to a connected position in which the bead on the conduit is positioned within the interior of the housing. When the conduit is moved to its connected position, a retainer contained within the housing lockingly engages the conduit bead to thereby prevent retraction of the conduit from the housing. Conventional seal means contained within the housing form a fluid seal between the housing and the outer periphery of the conduit.

A one way check valve is also contained within the fluid passageway formed in the housing. This check valve is resiliently urged to a closed position by a spring and is moved to an open position only by fluid flow from an entry end of the housing fluid passageway to an exit end of the housing fluid passageway.

In order to lock the conduit and housing together upon a partial insertion of the conduit end into the housing, the retainer also preferably includes a plurality of secondary locking tabs. These locking tabs engage the bead of a tubular conduit during only partial insertion the conduit into the housing and prevent refraction of the conduit from the housing.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 5 is a fragmentary sectional view illustrating a modification of the present invention;

FIG. 6 is a diagrammatic view illustrating the operation of the modification of FIG. 5;

FIG. 7 is a plan view illustrating a second preferred embodiment of the retainer;

FIG. 8 is a view taken substantially along line 8—8 in FIG. 7;

FIG. 9 is a view similar to FIG. 2 but illustrating a still further modified retainer of the present invention;

FIG. 10 is a elevational fragmentary view illustrating the retainer of FIG. 9;

DETAILED DESCRIPTION OF PREFERRED EMBODIMENTS OF THE PRESENT INVENTION

Figure 1:
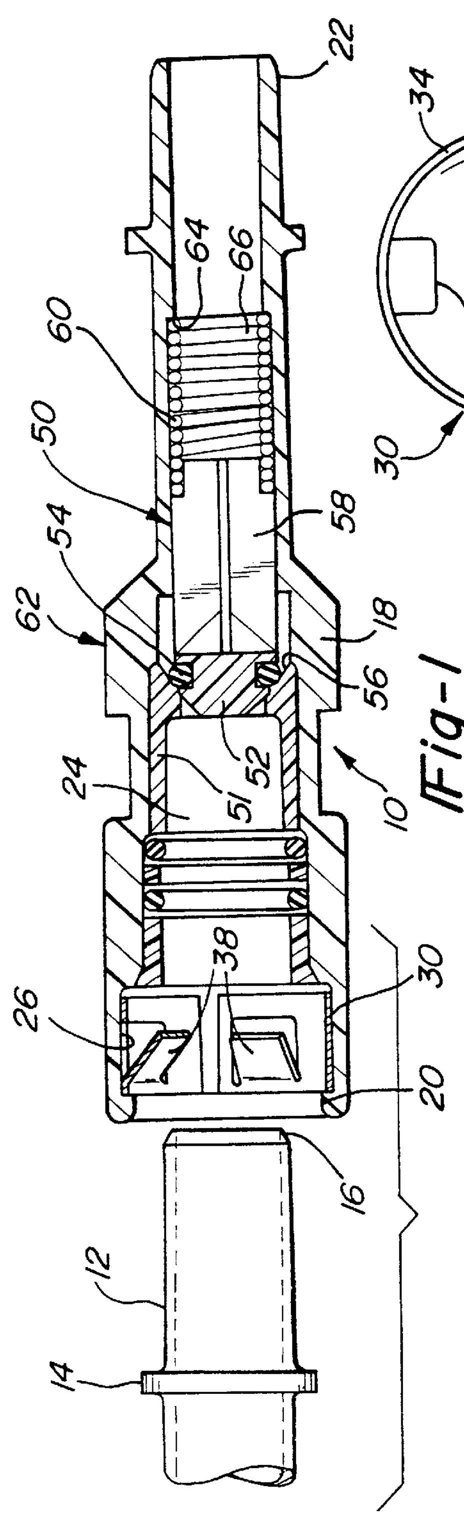
FIG. 1 is a longitudinal sectional view illustrating a preferred embodiment of the quick connect coupling of the present invention.

With reference first to FIG. 1, a preferred embodiment of the fluid connect or 10 of the present invention is there shown for use with a tubular conduit 12. The tubular conduit 12 includes a radially outwardly extending bead 14 adjacent its free end 16.

The fluid connector 10 includes an elongated tubular and cylindrical housing 18 having an entry end 20 and an exit end 22. An axially extending through bore 24 is formed between the housing ends 20 and 22 and this bore 24 forms a fluid passageway through the connector 10.

Figure 2:
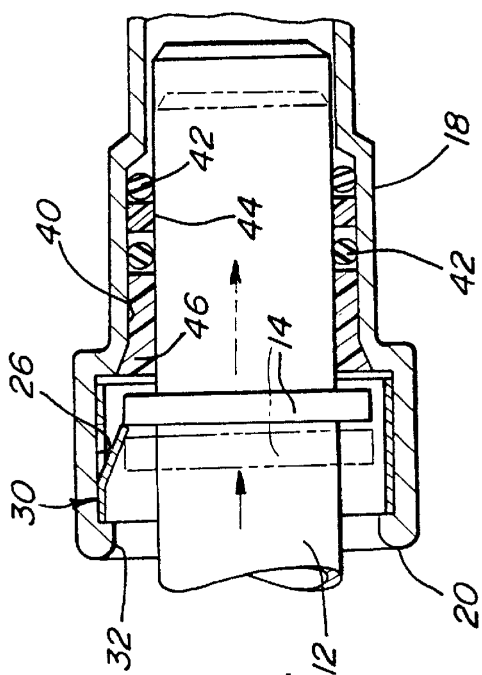
FIG. 2 is a fragmentary sectional view illustrating a portion of the preferred embodiment of the present invention.

With reference now to FIGS. 1—4, the entry end 20 of the housing 18 includes an enlarged diameter internal bore portion 26 which is sufficiently large to receive both the free end 16 of the fluid conduit 12 as well as its bead 14 as best shown in FIG. 2 of the drawing. Furthermore, the fluid conduit 12 is axially movable from a partially inserted position, illustrated in phantom line in FIG. 2, to a fully inserted position, illustrated in solid line in FIG. 2.

A spring retainer 30 is positioned within the enlarged diameter bore portion 26 of the housing 18. The retainer 30 is locked within the housing 18 by a lip 32 (FIG. 2) at the entry end 20 of the housing 18.

Figure 3:
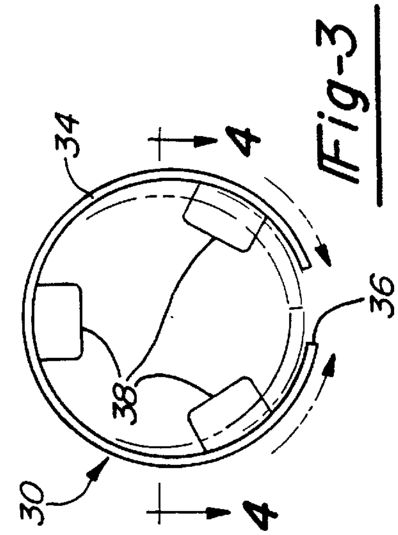
FIG. 3 is a plan view illustrating a preferred embodiment of a retainer of the present inventions.
Figure 4:
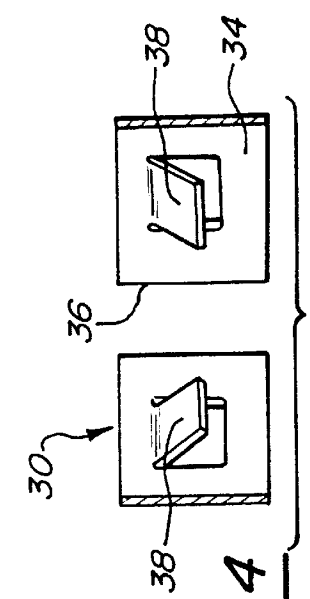
FIG. 4 is a sectional view taken substantially along line 4—4 in FIG. 3 and enlarged for clarity.

As best shown in FIGS. 3 and 4, the retainer 30 comprises a tubular and cylindrical body 34 which is preferably formed from spring metal although other materials can be used. The body 34 includes a split 36 so that the body 34 can be compressed from the position shown in solid line to the position shown in phantom line in FIG. 3. Compression of the retainer 30 enables the retainer 30 to be inserted into the position shown in FIG. 1. Upon release of the retainer body 34, the body 34 expands by thus entrapping the body 34 of the retainer 30 behind the housing lip 32. Additionally, the inner end 31 (FIG. 2) of the retainer 30 can be tapered inwardly to facilitate insertion of the retainer 30 into the housing 18.

As best shown in FIGS. 3 and 4, a plurality of circumferentailly space locking tabs 38 are provided around the retainer body 34. Preferably, the locking tabs 38 are integral with the retainer body 34 and are stamped from the body 34 so that the tabs project radially inwardly. In addition, as best shown in FIG. 1, with the retainer 30 positioned within the connector housing 18, the tabs 38 slope actually away from the inlet 20 of the housing 18 and towards the outlet end 22.

With reference now especially to FIG. 2, the connector housing 18 includes a reduced diameter bore portion 40 adjacent to and down stream from the enlarged diameter portion 26. A pair of spaced O rings 42 separated by a bushing 44 are provided within the reduced diameter portion 40 of the housing 18. A packing 46 contains the O rings 42 and bushing 44 within the housing 18.

The conduit 12 is insertable into the housing end 20 from a partially inserted position, shown in phantom line of FIG. 2, to a fully inserted position, shown in solid line in FIG. 2. During insertion of the conduit 12 into the housing 18, the bead 14 deflects the retainer tabs 38 radially outwardly until the tabs 38 pass behind the bead 14. The tabs 38 then snap radially inwardly to their initial position thus engaging the outwardly facing side of the bead 14 and securing the conduit 12 to the connector housing 18.

Simultaneously with the insertion of the conduit 12 into the housing end 20, the O rings 42 fluidly sealingly engage an outer periphery of the conduit 12. The O rings 42 thus form a fluid seal between the conduit 12 and the housing 18.

Figure 11:
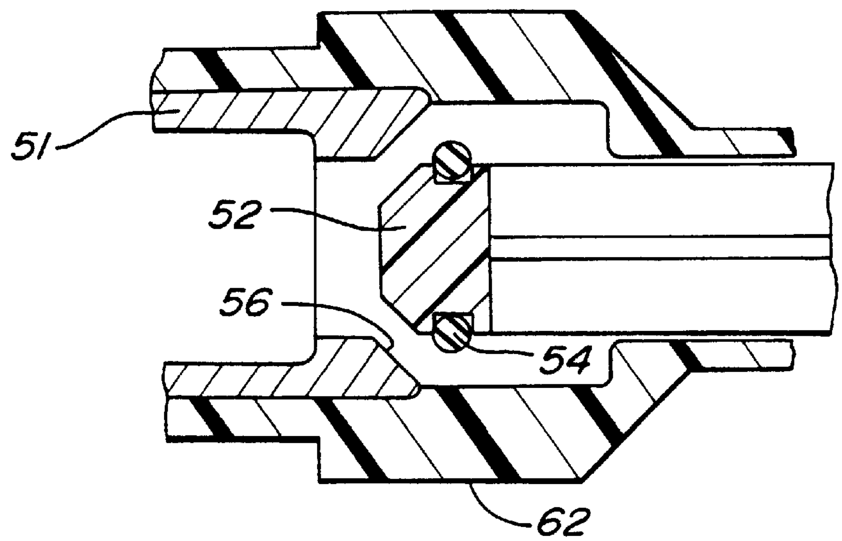
FIG. 11 is a fragmentary perspective view illustrating the one way valve in an open position.

With reference now to FIGS. 1 and 11, a one way or check valve assembly 50 is contained within the housing passageway 24 between the housing ends 20 and 22. The one way valve assembly 50 includes a valve head 52 having a seal member 54 which cooperates with a conical valve seat 56 formed by a sleeve 51 which is press fit into the valve housing 18. The valve head 52 is integrally formed with a valve body 58 having a cruciform cross section shape while a helical compression spring 60 urges the valve head 52 toward the valve seat 56.

The valve head 52 has a conical surface which cooperate with the conical valve seat 52 and the seal member 54 is carried on the conical surface of the valve head 52. Thus the seal member undergoes both radial and axial compression which enhances the fluid seal.

The opening pressure of the one way valve assembly 50 can be varied by substituting the compression spring 60 with a compression spring having a different spring constant. In this fashion, the valve assembly 50 acts as a pressure regulator and opens at the inlet end 20 of the housing 18 exceeds a predetermined pressure.

In operation, the valve spring 60 urges the valve head 52 to its closed position illustrated in FIG. 1 in which fluid flow from the outlet end 22 to the inlet end 20 is prohibited. Conversely, fluid flow from the conduit 12 and through the housing passageway 24 from its inlet end 20 to outlet end 22 opens the valve assembly 50 to the position shown in FIG. 11 against the force of the compression spring. Whenever the fluid pressure exceeds a preset amount, in doing so, fluid flow passes through the valve seat 56, around the valve head 52 and an enlarged diameter body portion 62 immediately a downstream from the valve seat 56, and out through the housing outlet end 22.

Any conventional means can be used to retain the spring 60 to the valve housing 18. However, as shown in FIG. 1, the housing includes a radially inwardly extending abutment surface 64 downstream from the valve seat 56. An end loop 66 on the valve spring 60 abuts against the abutment surface 64 to lock the end of the spring 60 against longitudinal movement to the housing 18.

From the foregoing comment can be seen that the valve assembly 50 permits fluid flow only from the inlet end 20 and to the outlet end 22 of the connector housing 18. Furthermore, the construction of the valve assembly 50 is not only inexpensive, but totally effective in operation.

With reference now to FIGS. 5–8, a modification of the retainer 30' is there shown. In the modification of the retainer 30', as before, the retainer 30' includes a tubular and cylindrical body 34 having a plurality of locking tabs 38 which extend radially inwardly from the body 34 and are circumferentially spaced from each other. These tabs 38, as before, engage the outwardly facing side of the conduit bead 14 as shown in phantom line in FIG.6.

Unlike the retainer 30 illustrated in FIGS, 1–4, however, the retainer 30" includes a plurality of secondary tabs 70 which are circumferentially spaced from each other and positioned in between the tabs 38. These secondary tabs 70 each have a free end 72 which is spaced axially outwardly from a free end 74 on the retainer tabs 38.

Consequently, as shown in FIG. 6, upon insertion of the conduit 12 to a partially inserted position, illustrated solid line, the secondary tabs 70 engage the outwardly facing side of the conduit bead 14 thus locking the conduit 12 to the connector housing 18 in a partially inserted position. However, as best shown in FIG. 6, even in a partially inserted position, the sealing O rings 42 engage the conduit 12 to fluidly seal the conduit 12 to the connector housing 18.

Thus, it can be seen that the FIGS. 5–8 embodiment of the present invention provides for positive locking of the conduit 12 to the connector housing 18 even during only a partial insertion of the conduit 12 into the housing 18. Upon full insertion of the conduit 12 into the housing 18, the primary locking tabs 38 engage the conduit bead 14 in the previously described fashioned.

With reference now to FIGS. 9–10, a still further modification of the retainer 30" is there shown. The retainer 30" includes the locking tabs 38 which engage the outwardly facing side of the conduit bead 14 upon full insertion of the conduit 12 into the housing 18. Unlike the previous two retainers 30 and 30 prime, however, the retainer 30" includes a plurality of circumferentially spaced and outwardly extending locking tangs 78 formed about its outwardly facing end. These locking tangs 78 engage windows or openings 79 formed in the housing 18. Such a construction is particularly useful when the housing is constructed of plastic.

Figure 12:
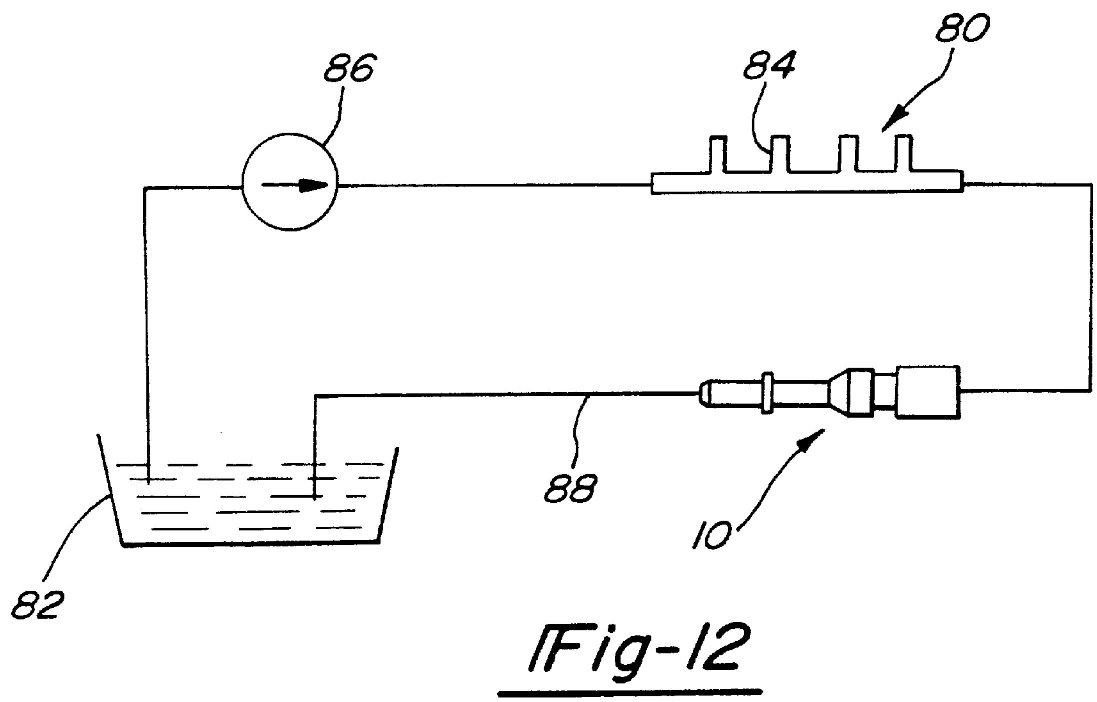
FIG. 12 is a diagrammatic view illustrating one application of the preferred embodiment of the present invention.

With reference now to FIG. 12, the fluid connector 10 is there shown for use with a fuel injection system 80 of an automotive vehicle. In the conventional fashion, the fuel injection system includes a fuel tank 82, a fuel injection rail 84, a pump 86 which pumps fuel from the tank 82 to the rail 84 and a return line 88 from the rail 84 to the fuel tank 82.

In fuel injection systems the pump 86 must maintain fuel pressurization, typically 35–40 psi, in the fuel rail 84 to ensure adequate fuel for the engine during all engine operation conditions. Typically, a pressure regulator has been provided in the return line 88 from the fuel rail 84. In addition to the pressure regulator, a quick connector coupling is often used to connect the fuel rail 84 to the return line 88.

By proper selection of the compression spring 60, the quick coupling 10 of the present invention with its pressure regulator capability can be used in likes of both the previously used pressure regulator and quick connect coupling. Consequently, substantial cost savings are achieved.

From the foregoing it can be seen that the connector of the present invention provides a simple, inexpensive, and yet totally effective quick connect coupling. We claim: having a check valve which can operate as a pressure regulator. Having described, my invention, however, many modifications thereto will become apparent to those skilled in the art to which it pertains without deviation from the spirit of the invention as defined by the scope of the appended claims.

I claim:

1. A quick connect coupling for use with a tubular conduit having a radially outwardly extending bead adjacent a free male end portion comprising:

an elongated tubular and cylindrical housing having a female end portion and having an axial passageway formed therethrough which forms a fluid passageway, said housing being open at both ends, the female end of said housing having an enlarged diameter internal bore portion adapted to axially receive the free male end of said conduit, said enlarged diameter internal bore portion having an axial length sufficient to receive the bead on the conduit within said internal bore portion when the conduit is axially inserted into said internal bore portion to a connected position, means contained within said internal bore portion for automatically lockingly engaging in a single step the conduit bead when said conduit is moved to a connected position, means in said housing passageway for fluidly sealing the conduit to said housing when the conduit is moved to a connected position, means contained within said housing passageway for permitting fluid flow in only one direction from sale male end portion of said conduit to said female end portion of said housing through said housing passageway, wherein said locking means comprise a spring retainer contained in said enlarged diameter bore portion in said housing, said retainer having at least one set of deflectable legs which engage an outwardly facing side of the bead when the conduit is moved to its connected position;

wherein said retainer comprises a second set of deflectable legs, said second set being axially outwardly spaced from said first set of legs, said second set of legs engaging the outwardly facing side of the bead when the conduit is moved to a partially inserted position into said housing end;

wherein said sealing means engages the conduit when the conduit is moved to said partially inserted position.

2. A quick connect coupling for use with a tubular conduit having a radially outwardly extending bead adjacent a free male end portion comprising:

an elongated tubular and cylindrical housing having a female end portion and having an axial passageway formed therethrough which forms a fluid passageway, said housing being open at both ends, the female end of said housing having an enlarged diameter internal bore portion adapted to axially receive the free male end of said conduit, said enlarged diameter internal bore portion having an axial length sufficient to receive the bead on the conduit within said internal bore portion when the conduit is axially inserted into said internal bore portion to a connected position, means contained within said internal bore portion for automatically lockingly engaging in a single step the conduit bead when said conduit is moved to a connected position, means in said housing passageway for fluidly sealing the conduit to said housing when the conduit is moved to a connected position, means contained within said housing passageway for permitting fluid flow in only one direction from sale male end portion of said conduit to said female end portion of said housing through said housing passageway, wherein said locking means comprise a spring retainer contained in said enlarged diameter bore portion in said housing, said retainer having at least one set of deflectable legs which engage an outwardly facing side of the bead when the conduit is moved to its connected position;

wherein said housing includes an inwardly protruding lip at said first end of said housing, and said retainer comprising a plurality of outwardly extending locking tangs which engage said lip to thereby secure said retainer to said housing.

3. In combination with a fuel injection system having a fuel rail, means for supplying pressurized fuel to the fuel rail, from a fuel tank and a return rail to the fuel tank, said return line having a tubular conduit with a radially outwardly bead adjacent a free male end portion, a quick connect coupling comprising an elongated tubular and cylindrical housing having a female end portion and having an axial passageway formed therethrough which forms a fluid passageway, said housing being open at both ends, the female end of said housing having an enlarged diameter internal bore portion adapted to axially receive the free male end of the conduit, said enlarged diameter internal bore portion having an axial length sufficient to receive the bead on the conduit within said internal bore portion when the conduit is axially inserted into said internal bore portion to a connected position, means contained within said internal bore portion for automatically lockingly engaging in a single step the conduit bead when said conduit is moved to a connected position, means in said housing passageway for fluidly sealing the conduit to said housing when the conduit is moved to a connected position, means contained within said housing passageway for permitting fluid flow in only one direction from said male end portion of said conduit to said female end portion of said housing through said housing passageway only when the fluid pressure in the rail exceeds a predetermined amount.

4. The invention as defined in claim 3 wherein said means form permitting fluid flow in only one direction comprises a check valve contained in said housing passageway.

5. The invention as defined in claim 4 wherein said check valve permits fluid flow only from said one end of said housing to the other end of said housing.

6. The invention as defined in claim 5 wherein said housing comprises a reduced a diameter portion along said housing passageway, said reduced diameter portion forming a valve seat for said check valve.

7. The invention as defined in claim 6 wherein said check valve comprises a elongated body having a valve head at one end, and means for resiliently urging said valve head against said valve seat.

8. The invention as defined in claim 7 wherein said resilient urging means comprises a compression spring.

* * * * *